United States Patent [19]

Stearns

[11] 3,885,866

[45] May 27, 1975

[54] COMPENSATION APPARATUS FOR IMPROVED MICROFILM CODE FIELD READING

[75] Inventor: Richard D. Stearns, Rochester, N.Y.

[73] Assignee: Eastman Kodak Company, Rochester, N.Y.

[22] Filed: Apr. 8, 1974

[21] Appl. No.: 458,749

[52] U.S. Cl. ...................... 353/26; 353/85; 250/570

[51] Int. Cl. ..................... G03b 21/20; G03b 21/11; G03b 23/12

[58] Field of Search ................................ 353/25–27, 353/85; 250/557, 570; 355/1, 41

[56] References Cited

UNITED STATES PATENTS

| | | | |
|---|---|---|---|
| 2,618,197 | 11/1952 | Boushey | 353/85 |
| 3,202,045 | 8/1965 | Arsemault | 355/1 |
| 3,622,793 | 11/1971 | Dalton | 250/570 |
| 3,708,677 | 1/1973 | Volk | 250/557 |
| 3,734,611 | 5/1973 | Knapp | 355/41 |
| 3,746,840 | 7/1973 | Ogland | 250/570 |
| 3,778,630 | 12/1973 | White | 353/26 |

*Primary Examiner*—Richard E. Aegerter
*Assistant Examiner*—A. J. Mirabito
*Attorney, Agent, or Firm*—D. R. Arndt

[57] ABSTRACT

Compensation apparatus includes a light source for illuminating an information code field disposed on microfilm having bit positions of selectively different relative optical densities (viz, transparent or opaque), and code field reading photocells responsive to the intensity of light passing through such bit positions to produce signals having levels representative of the relative optical densities of the bit positions in such code field, respectively. The level of the optical density signals will vary as a function of changes in the film density. The apparatus further includes circuitry responsive to the intensity of light passing through transparent bit positions for producing a reference signal which is a function of film density and the intensity of illumination of the light source, and a signal level comparator responsive to the "variable" optical density signals and the reference signal to produce digital signals representative of the relative "low" or "high" optical density of the bit positions and which are compensated for or free from ambiguity caused by variations in film density.

2 Claims, 3 Drawing Figures

COMPENSATION APPARATUS FOR IMPROVED MICROFILM CODE FIELD READING

BACKGROUND OF THE INVENTION

1. Field of the Invention

The present invention relates to microfilm code field reading apparatus.

2. Description of the Prior Art

In microfilm information storage and retrieval systems, reduced document images are recorded on film. The reduction of size of document images provides a substantial reduction in document storage volume and simplifies mass handling of documents. Since literally thousands of document images may be stored on a reel of film, searching of these images utilizing visual techniques for retrieval of a particular document image is extremely time consuming. Automatic microfilmers have been developed which use film coding arrangements whereby document images are accompanied by identifying code fields having a plurality of bit positions which contain digital information identifying particular document images. Automatic microfilm reader apparatus scan and decode the predetermined code fields. Typically, after locating a predetermined code field, the reader moves the identifying document image to a projection station wherein the document image may be projected onto a viewing screen. An example of such a system is disclosed in commonly assigned U.S. Pat. No. 3,290,987 to James et al., wherein a reader station includes a plurality of photocells with each such photocell being adapted to monitor a particular bit position of a code field aligned in the reader station. The photocells produce output digital signals having levels representative of the optical density of corresponding bit positions. The reader further includes logic means responsive to such digital signals to make a comparison with information stored in a memory unit to determine whether or not a particular document code field corresponding to the stored information is being decoded.

A problem with existing code field readings apparatus is that there is a liklihood of error in the digital signal if there are line voltage variations, lamp aging, degradation in code field reading optics caused by dust or dirt or possible variations in film density (often referred to in the art as $D_{min}$). More particularly, prior art apparatus do not always satisfactorily compensate for changes in the density levels of bit positions. For example, the optical density of a low level bit position in one code field can be considerably different than the optical density of another low level bit position in another code field located on the same film strip. These changes can be due at least in part to variations in film density.

SUMMARY OF THE INVENTION

Accordingly, it is an object of the invention to provide an improved code field reading apparatus which is adapted to be free from ambiguities (compensate) caused by variations in film density and/or light source intensity to provide more accurate decoding of code fields.

In the disclosed embodiment of the invention, code field reading apparatus is disclosed which includes a light source for illuminating a code field having a plurality of bit positions of either a relative transparent (low) or a relative opaque (high) optical density which can vary as a function of variations in film density, code field reading means responsive to the intensity of light passing through these bit positions to produce signals having levels corresponding to the relative optical density of these bit positions, respectively, reference signal producing means responsive to the intensity of light passing through clear bit positions, such light intensity being a function of film density and the intensity of illumination of the light source, to produce a reference signal, and means responsive to the optical density signals and the reference signal to produce digital signals accurately representative of the low or high contrast of the bit positions in the code field, said digital signals being compensated for variations in film density and/or light source intensity, whereby code field reading accuracy is improved.

BRIEF DESCRIPTION OF THE DRAWINGS

The above and other objects and advantages of the present invention will become apparent from the following detailed description taken in conjunction with the attached drawing wherein.

DESCRIPTION OF THE PREFERRED EMBODIMENT

Figures 1, 1A:
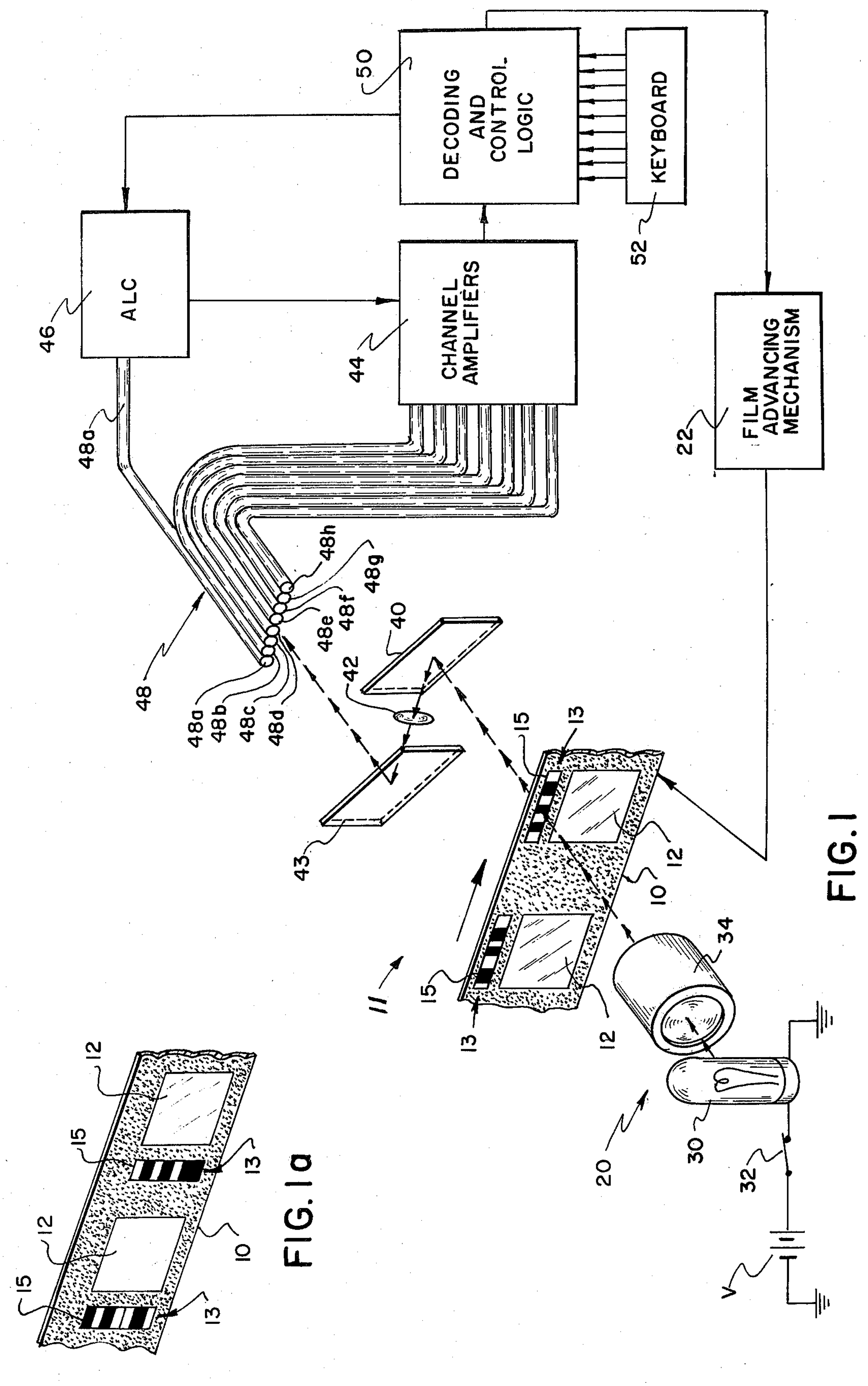
FIG. 1 is a block diagram showing the general arrangement of an automatic microfilm document reader apparatus in accordance with the present invention.
FIG. 1*a* shows an alternative location of a code field disposed adjacent to a document image.

To facilitate an understanding of the present invention, reference is first made to the portion of FIG. 1 which shows a microfilm strip 10 which may be used in a microfilm reader apparatus 11 in accordance with the invention. The film strip 10 includes a plurality of information or document images 12. Disposed adjacent to each such image 12 is an identifying code field 13. The code field 13 includes one column 15 having a predetermined number of digital bit positions, respectively. Each bit position is in the form of a rectangular area (having a relatively opaque or transparent optical density). In the code field arrangement of FIG. 1, if any given bit position is of one optical density (viz, relatively opaque), then adjacent positions are the opposite optical density (viz, relatively transparent). By different optical density it is meant that the bit positions are selectively in one of two detectable states. The digital information may then be contained in the width of the bit position, i.e., if logical 0 is a narrow width, the logical 1 could be, for example, twice as large in width as logical 0. Apparatus which may be adapted for use to decode the FIG. 1 code field is disclosed in detail in U.S. Pat. No. 3,617,707 to Shields. In decoding such a code field, the reader apparatus 11 sequentially reads the code field bit positions. However, it will be understood that the present invention is suitable for use with a code field of a form such as shown in FIG. 1*a*. In this latter case, the bit positions all are the same width and all the bit positions are read simultaneously (in parallel). Here the information is selectively contained in the optical density of a bit position rather than the width as the FIG. 1 code field. An example of this latter code field arrangement is disclosed in commonly assigned U.S. Pat. No. 3,768,897 to Spani. As set forth in this Spani patent, the information pertinent to a particular search may be recorded in any one of a plurality of columns preceding or following a corresponding document image.

In the illustrated embodiment of FIG. 1, there is provided a reader station 20 and a film transporting mechanism 22 (shown for convenience as only a block) for moving the film in a forward or reverse direction relative to the station 20 to position code fields in the station 20 for retrieval purposes. Block 22 will also be understood to include all the necessary but conventional motor drive circuits. A particular mechanism which is suitable for advancing film is disclosed in commonly assigned U.S. Pat. No. 3,768,897. Further, although the reader statiotn 20 may take various forms known in the art, the reader apparatus disclosed in commonly assigned U.S. Pat. No. 3,290,987 entitled, AUTOMATIC SEARCHING FILM READER in the name of James et al. is adaptable for use with apparatus in accordance with the present invention, especially those which decode code fields of the FIG. 1*a* variety.

Returning to the station 20, it is schematically shown to include a projection lamp or light source 30 which is adapted to be connected to a battery V when a switch 32 is closed. The light source 30 may take various forms known in the art such as commercially available incandescent gaseous lamps. The term light as used herein shall mean and refer to radiation in any portion of the spectrum which can be used in accordance with the invention. The station 20 further includes a lens condensing system 34 having a plurality of lenses, for condensing light from the light source 30 to illuminate the film strip 10. More particularly, when the light source 30 is energized, it illuminates a document and accompanying code field and light passes through such code field and illuminates a mirror 40 disposed adjacent the station 20. Mirror 40 directs light passing through the code fields to a code lens 42 which projects it onto a second mirror 43. The second mirror 43 is adapted to direct such light onto a fiber optic assembly 48 comprising eight individual and discrete bundles of fiber optics 48 (*a–h*).

Figure 2:
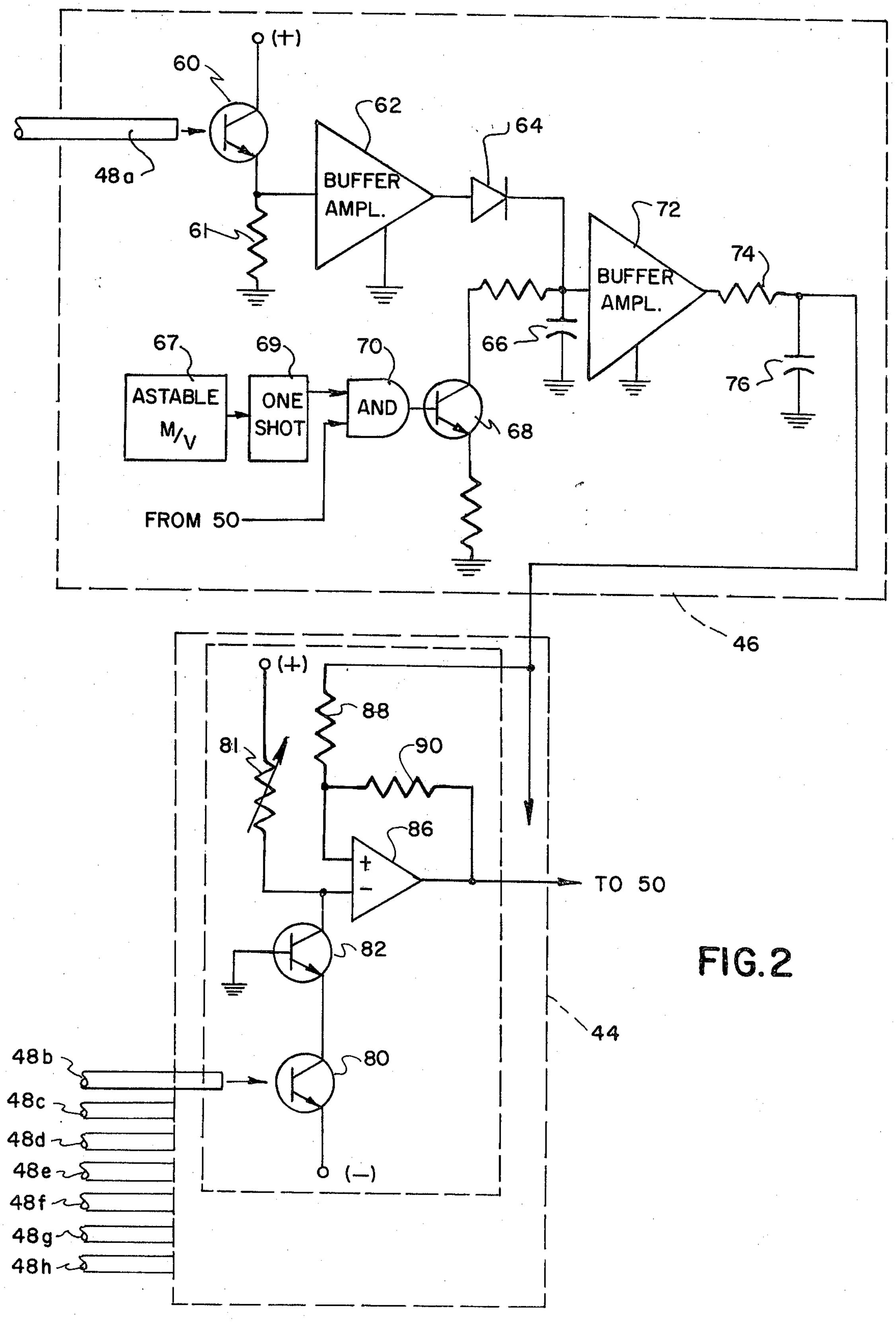
FIG. 2 is a diagram partially in block and partially in schematic form showing in more detail than FIG. 1 the automatic light control block 46 and the details of one of the channel amplifiers shown as block 44 in FIG. 1.

With reference to the FIG. 1 code field, each bundle of fiber optics is arranged in a line (sequential alignment) relative to the bit positions of a code field and conducts light which passes through its corresponding bit position to a particular one of channel amplifier 44. In FIG. 2, each channel amplifier 44 is shown to include a photocell which in the illustrated embodiment is a phototransistor 80 that in response to the incident level of radiant energy provides a signal representative of the optical density of its corresponding bit position. The term photocell as used herein shall mean and refer to the various forms of light responsive detector devices available in the art which can be used in accordance with the invention.

One channel amplifier 44 is shown in detail and will be described shortly. When the phototransistors in amplifiers 44 see a rapid change in light level, they produce pulses of the appropriate widths of current. The level indicates optical density and width or time duration of these current pulses determines whether the decoded bit position is either a logical one or a logigal zero. When there is a change of state of the first phototransistor, the logic 50 can then check the outputs of all the phototransistors 48 and decode the code field. Alternatively, only two detectors could be used wherein they are spaced a distance of 1.5 times the width of the smaller size bit position. Still further, the decoding of a code field could be accomplished by a single detector which is coupled into system logic adapted to store the length of time such detector output is in its various ones of two states to decode the information in the code field.

Decoding logic 50 includes a conventional memory storage unit which receives and stores information from a keyboard 52 corresponding to a particular code field. An example of such apparatus is disclosed in commonly assigned U.S. Pat. No. 3,768,897 wherein a control unit compares the data on a plurality of channels with that stored in memory and makes a determination if a document image corresponds to that in the memory if the logic 50 is at the reader station 20.

The keyboard 52 will be understood to include a series of buttons which permit a user to enter information into the memory in the logic 50. A typical keyboard which may be used in accordance with the present invention is shown in FIG. 1 of the aforementioned U.S. Pat. No. 3,290,987.

In operation, a user enters via the keyboard 52 (FIG. 1) information into the memory of logic 50 which describes a code field representative of a desired document image stored on the microfilm strip 10. A search mode is commenced by depressing the appropriate key of the keyboard 52. When the sequential output of the photocells 80 correspond to such keyboard entered information, the logic 50 indicates that there has been a so called "hit". At this time, the logic 50 produces the requisite signals to film advancing mechanism 22 causing it to align the decoded document image which has been decoded at the reader station 20. Thereafter, the light from the projection lamp 30 illuminates such document image and the document image is projected by a mechanism (not shown) upon a viewing screen. If the logic 50 is adapted to decode a code word such as shown in FIG. 1a, then the fiber optics 48 are disposed in a line parallel to the long edges of the column 15 and will only be in the decoding state when each bundle is in a position to produce a signal representative of the contrast in its corresponding bit cell. The organization of such logic 50 is so similar to that shown in commonly assigned U.S. Pat. No. 3,768,897 that one skilled in the art will be able to fully appreciate its operation without further discussion here.

In accordance with the present invention, the signal levels produced by the seven code channel amplifiers 44 are representative of relative optical density levels and are compensated in each individual channel amplifier for line voltage variations, intensity ripple, lamp aging, degradation of code field reading optics by dust and dirt and/or variations in film base density ($D_{min}$). Towards this end, automatic light control circuitry (ALC) 46 has been provided. In FIG. 2, the ALC 46 is shown to include a phototransistor 60 having its collector connected to a source of positive potential. When the base electrode of the transistor 60 is illuminated by light conducted by the eight fiber optic assembly 48*a*, current flows through the collector emitter electrodes and a resistor 61 to ground. This eight optical fiber bundle 48*a* is actually first in line relative to the other seven bundles so that it encounters light from each of the bit positions before the others. A voltage is developed at the junction of the emitter electrode of the phototransistor 60 and the resistor 61 and is applied to a buffer amplifier 62. The peak signal produced by transistor 60 is a reference signal in the form of a voltage level that is a function of the radiant energy passing through that portion of the code field aligned with the phototransistor 60. Viewed differently, this reference signal is a function of the film density and the intensity of illumination of the light source 30.

The detector circuit that is shown as a simple rectifier 64 is serially connected between the output of the amplifier 62 and a peak storage memory capacitor 66. A transistor 68 has its collector electrode connected to electrical junction of the diode 64 and the capacitor 66. Except when a pulse type signal is applied to the base electrode of a transistor 68, such transistor 68 is normally held in a cut-off condition so that the capacitor 66 will only follow and store the peak signal levels produced by the buffer amplifier 62. As will be described shortly, when the transistor 68 is momentarily turned on, the capacitor 66 discharges to ground through a circuit completed through the collector-emitter electrodes of the transistor 68 and transistor 68 then is turned off. At this time, the signal (voltage) to be held by the capacitor 66 can be updated. The voltage on the capacitor 66 is a function of the light intensity peak in the preceding time interval between when the transistor 68 was last turned on. The reason for the frequent update of the voltage stored by the capacitor 66 is that such stored capacitor voltage only follows the peak level passing through bit positions and such peak can change with variations in the intensity of the illumination of the lamp 30 and/or $D_{min}$ of the film. More particularly, with the transistor 68 turned off, the capacitor 66 can only charge when the voltage on the capacitor is less than the voltage level applied to the diode 64 less any voltage drop across such diode. Thus, it is important to frequently update the sample and store new peak voltages on the capacitor 66.

In accordance with the disclosed embodiment, the capacitor 66 is discharged and updated every 10 miliseconds. To accomplish this function, an oscillator 67 (which may be an astable multivibrator) is selected to operate at approximately $100H_z$ and produce square waves which drive a monostable multivibrator (one shot device 69) that in each input cycle produces a five microsecond pulse. The output of the one shot device 69 is connected to one input terminal of an AND gate 70. The other input terminal to the AND gate 70 is from logic 50 and is energized when such logic 50 is operating in a search mode. In such mode, the one shot pulses are then gated through AND gate 70 and applied to the base electrode of the transistor 68. The five microsecond pulses may be current amplified through pulse shaper circuits (not shown), which could be disposed between the output of the AND gate 70 and the base electrode input to the transistor 68.

When a pulse is applied to the base electrode of the transistor 68, the capacitor memory 66 will quickly be discharged. Thereafter, when the pulse is removed and the transistor 68 turned off, the memory capacitor 66 is in effect released to assume a voltage corresponding to the peak voltage applied through the peak detector diode 64.

The capacitor 66 is connected to buffer amplifier 72 having a very high input impedance. The output signal of the buffer amplifier follows the voltage stored on the capacitor 66. A low-pass filter stage comprising a resistor 74 and a capacitor 76 is coupled between the output of the buffer amplifier 72 and the channel amplifier circuits 44. The filter stage is provided so that the transients experienced by the memory capacitor 66 during either discharge or restoring of signal level will not be coupled into the channel amplifiers 44. Therefore, the signal applied to the channel amplifiers is of a varying DC level which is representative of the peak values stored by the capacitor 66. This signal level is used by the channels 44 as a reference signal to interpret which one of a relatively opaque or transparent optical density bit position is being decoded by the corresponding fiber optic assembly 48.

One of the channel amplifiers 44 (corresponding to light pipe *4B*) is shown in FIG. 2 and is shown to include a phototransistor 80 connected in series with a source of positive potential through an adjustable resistor 81, and transistor 82. In operation, when a high intensity light burst conducted by fiber optic assembly 48*b* illuminates the base electrode of the transistor 80, the transistor 80 conducts and completes a circuit path from the positive potential through resistor 81, and collector emitter electrodes of transistor 82 and the collector, emitter electrodes of the transistor 80 to the negative potential. As the intensity of light varies, the voltage at the electrical junction of the collector emitter of the transistor 82 and the resistor 81 varies. However, it is negatively clamped at less than a diode drop below ground by virtue of the connection of the base electrode of the transistor 82 to ground. This voltage, which is applied to the negative terminal of a voltage comparator 86, is at a level which is a function of the relative optical density of its corresponding bit position. The reference signal output of the low-pass filter (viz, resistor 74 and capacitor 76) is applied by way of a scaling resistor 88 to the positive input of the voltage comparator 86. The resistor 81 is adjusted so that when the voltage in the negative input to the amplifier 86 is greater than that of the positive input, a negative signal is produced representing a high contrast bit position. Alternatively, when this voltage is less than that applied to the positive terminal, a low contrast bit position is being decoded and a positive signal produced. In addition, there is a feedback resistor 90 which operates to provide some hysteresis to improve the noise immunity of the channel amplifier.

In operation, the code various channel amplifiers in response to light burst conducted by light pipes 48 (*b–h*) which gate on or off phototransistors 80 and produce voltages which are either relatively high or a low level depending on whether the code field bit position being read is relatively opaque or transparent. These relative levels are then compared against the referenced level produced by the ALC circuit and appropriately scaled to provide an indication to the logic 50 whether a high or low optical density bit position is being decoded.

The digital output signal produced by the comparator 86 is thus compensated for variations in film density and/or light source intensity. In the instance where the FIG. 1 embodiment code field is being used, the logic 50 responds to durations or pulse widths to determine whether it is a one or a zero whereas if the FIG. 1*a* code field embodiment were used, logic 50 simultaneously reads the contrast of all the bit positions in a column.

The invention has been described in detail with particular reference to a preferred embodiment thereof, but it will be understood that variations and modifications can be effected within the spirit and scope of the invention.

I claim:

1. In automatic retrieval apparatus including a code field reading station, means for moving an information bearing medium having at least one image and an identification code field disposed adjacent thereto to position such code field in said reading station, the code field having a plurality of information bit positions having relatively low (i.e., transparent) and/or high (i.e., opaque) optical densities respectively, and a light source for illuminating the code field, the improvement comprising:

a. a plurality of photocells disposed relative said reading station and arranged so as to correspond to bit positions of a code field positioned in said station, respectively, said plurality of photocells being responsive to light from said source for producing signals having relative levels indicative of the relative optical densities of corresponding bit positions, respectively;

b. automatic light control circuitry having (i) another photocell disposed relative to said reading station and arranged to produce a signal corresponding to the intensity of light passing through low optical density bit positions of the code field; and (ii) memory storage means responsive to the signal produced by said another photocell for producing a reference signal;

c. means responsive to said reference signal and said plurality of optical density indicating signals for producing digital signals representative of the relatively low or high contrast of said bit positions, respectively; and d. logic and control means responsive to said digital signals for determining when a code field having a desired information is at said reading station.

2. The invention as set forth in claim 1 wherein said bit positions have alternate optical densities and wherein the width of such bit positions defines its information content.

* * * * *